United States Patent
Bodziony et al.

(10) Patent No.: US 10,089,353 B2
(45) Date of Patent: Oct. 2, 2018

(54) APPROXIMATE STRING MATCHING OPTIMIZATION FOR A DATABASE

(71) Applicant: INTERNATIONAL BUSINESS MACHINES CORPORATION, Armonk, NY (US)

(72) Inventors: Michal Bodziony, Tegoborze (PL); Lukasz Gaza, Jankowice (PL); Artur M. Gruszecki, Cracow (PL); Tomasz Kazalski, Cracow (PL); Konrad K. Skibski, Zielonki (PL); Tomasz Stradomski, Będzin (PL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 14/926,119

(22) Filed: Oct. 29, 2015

(65) Prior Publication Data

US 2017/0124147 A1    May 4, 2017

(51) Int. Cl.
*G06F 17/30*    (2006.01)

(52) U.S. Cl.
CPC .. *G06F 17/30442* (2013.01); *G06F 17/30536* (2013.01)

(58) Field of Classification Search
CPC ............................................... G06F 17/330536
USPC ........................................ 707/758, 705, 706
See application file for complete search history.

(56) References Cited

U.S. PATENT DOCUMENTS

| | | | |
|---|---|---|---|
| 6,973,452 B2 | 12/2005 | Metzger et al. | |
| 7,010,522 B1 | 3/2006 | Jagadish et al. | |
| 7,996,369 B2 | 8/2011 | Li et al. | |
| 8,224,830 B2 | 7/2012 | Bidlack | |
| 8,229,734 B2 | 7/2012 | Bennett | |
| 9,141,648 B1 | 9/2015 | Birnbaum et al. | |
| 9,177,227 B2 | 11/2015 | Chehaiber | |
| 2009/0265340 A1 | 10/2009 | Barcklay et al. | |
| 2010/0005081 A1 | 1/2010 | Bennett | |
| 2010/0106713 A1 | 4/2010 | Esuli et al. | |
| 2010/0125594 A1 | 5/2010 | Li et al. | |

(Continued)

FOREIGN PATENT DOCUMENTS

CN    105893453 A    8/2016

OTHER PUBLICATIONS

IBM, "List of IBM Patents or Patent Applications Treated as Related (Appendix P)," Mar. 14, 2016, p. 1-2.

(Continued)

*Primary Examiner* — Baoquoc N To
(74) *Attorney, Agent, or Firm* — Patricia B. Feighan

(57) ABSTRACT

Software for processing a database query that includes: (i) receiving a query of a database including a search value; (ii) determining a distance between the search value and at least one reference value; (iii) determining a maximum distance from the search value to be used in searching a plurality of datasets of the database, wherein the maximum distance from the search value defines a search range and is based, at least in part, on the determined distance between the search value and the at least one reference value; (iv) determining a subset of datasets from the plurality of datasets that includes datasets for which a data range with respect to each reference value overlaps with the search range; and (v) performing approximate string matching for the search value on the subset of datasets.

2 Claims, 8 Drawing Sheets

(56) References Cited

U.S. PATENT DOCUMENTS

| | | |
|---|---|---|
| 2011/0082855 A1 | 4/2011 | Al-Omari et al. |
| 2013/0212090 A1 | 8/2013 | Sperling et al. |
| 2013/0262489 A1 | 10/2013 | Shirakawa |
| 2014/0095520 A1 | 4/2014 | Ziauddin et al. |
| 2015/0242452 A1 | 8/2015 | Dickie et al. |
| 2015/0286682 A1 | 10/2015 | Ziauddin |
| 2015/0347492 A1 | 12/2015 | Dickie |
| 2015/0363404 A1 | 12/2015 | Dickie |
| 2016/0004740 A1 | 1/2016 | Bendel et al. |
| 2016/0098451 A1 | 4/2016 | Dickie |
| 2016/0239538 A1 | 8/2016 | Gaza et al. |
| 2016/0239549 A1* | 8/2016 | Gaza ............ G06F 17/30536 |
| 2017/0068688 A1 | 3/2017 | Brodt et al. |

OTHER PUBLICATIONS

Gaza et al., "Method for Processing a Database Query," Application and Drawings, Filed on Feb. 13, 2015, 28 Pages, U.S. Appl. No. 14/621,466.

Gaza et al., "Method for Processing a Database Query," Application and Drawings, Filed on Mar. 9, 2016, p. 1-26, U.S. Appl. No. 15/064,662.

Wikipedia, "Hamming Distance," Wikipedia, the Free Encylopedia, Last Modified on Oct. 29, 2015, p. 1-4, https://en.wikipedia.org/wiki/Hammin_distance, Accessed on Nov. 2, 2015.

Anonymous, "Method of Limiting I/O Operations for Spatial Data in Data Warehouses," An IP.com Prior Art Database Technical Disclosure, Jan. 24, 2017, p. 1-5, IP.com No. IPCOM000248962D.

IBM, "List of IBM Patents or Patent Applications Treated as Related (Appendix P)," May 30, 2017, p. 1-2.

Bodziony et al., "Approximate String Matching Optimization for a Database," Application and Drawings, Filed on Apr. 24, 2017, 38 Pages, U.S. Appl. No. 15/494,874.

Gaza, L. Original U.S. Appl. No. 14/621,466, filed Feb. 13, 2015.

Johnson, "Algorithm of the Week: Damn Cool Levenshtein Automata," Big Data/Analytics Zone, Jun. 25, 2013, p. 1-8, Architects Zone, DZone, Inc., http://architects.dzone.com/articles/algorithm-week-damn-cool-1, Accessed on: Jan. 21, 2015.

Rane et al., "Privacy Preserving String Comparisons Based on Levenshtein Distance," IEEE International Workshop on Information Forensics and Security (WIFS), Dec. 2010, Mitsubishi Electric Research Laboratories, Inc.

"Approximate string matching"; Wikipedia—the free encyclopedia; Page last modified Jul. 28, 2015; Accessed on: Aug. 8, 2015; <https://en.wikipedia.org/wiki/Approximate_string_matching>.

"Levenshtein distance," Wikipedia, the free encyclopedia, Page last modified on Jan. 11, 2015, Accessed on: Jan. 21, 2015; <http://en.wikipedia.org/wiki/Levenshtein_distance>.

Appendix P.: List of IBM Patents or Patent Applications Treated as Related, Dated Oct. 28, 2015, 2 pages.

* cited by examiner

Hamming distance:

| I | N | V | E | N | T | I | O | N |
|---|---|---|---|---|---|---|---|---|
| ≠ | ≠ | ≠ | ≠ | ≠ | = | = | = | = |
| E | X | E | C | U | T | I | O | N |
| 1 | 1 | 1 | 1 | 1 | 0 | 0 | 0 | 0 |

→ 5 substitutions

| | | $D_{Ref1}$ | Range 1 | $D_{Ref2}$ | Range 2 |
|---|---|---|---|---|---|
| Dataset 1 | CONFIDENCE | 9 | Max: 9 | 9 | Max: 10 |
| Dataset 1 | COMPANY | 9 | Max: 9 | 10 | Max: 10 |
| Dataset 1 | RESISTOR | 9 | Min: 8 | 9 | Min: 9 |
| Dataset 1 | SLOWDOWN | 8 | Min: 8 | 10 | Min: 9 |
| Dataset 2 | MARKER | 10 | Max: 10 | 9 | Max: 9 |
| Dataset 2 | CHEROKEE | 9 | Max: 10 | 7 | Max: 9 |
| Dataset 2 | EARTH | 10 | Min: 9 | 9 | Min: 7 |
| Dataset 2 | CEMENT | 10 | Min: 9 | 8 | Min: 7 |

Reference values:

Ref1: OOOOOOOOO
Ref2: E E E E E E E E E

Fig. 2

APPROXIMATE STRING MATCHING OPTIMIZATION FOR A DATABASE

BACKGROUND

The present invention relates generally to the field of databases, and more particularly to database query processing.

A challenge of modern database management is the amount of data which has to be processed per every database query. One approach for limiting resource consumption and the amount of input/output operations on discs is to introduce low-level statistics for the data in the database. In this approach, some basic statistics are kept for small datasets of data. For example for each dataset, the minimum and the maximum value of the entries of a particular column are determined. If a query asks about data which is determined not to be within the range given by the minimum and maximum value of the column, the respective column will not be read from the disc at all, as the searched data cannot be found in this column.

SUMMARY

According to an aspect of the present invention, there is a method, computer program product and/or system that performs the following operations (not necessarily in the following order): (i) receiving a query of a database, wherein the query includes a search value, and wherein the database includes a plurality of datasets; (ii) determining a distance between the search value and at least one reference value; (iii) determining a maximum distance from the search value to be used in searching the database, wherein the maximum distance from the search value defines a search range and is based, at least in part, on the determined distance between the search value and the at least one reference value; (iv) determining a subset of datasets from the plurality of datasets that includes datasets for which a data range with respect to each reference value overlaps with the search range; and/or (v) performing approximate string matching for the search value on the subset of datasets. Each dataset of the plurality of datasets is assigned a minimum distance and a maximum distance between values of dataset entries and the at least one reference value and the minimum distance and the maximum distance for each dataset define the data range for the respective dataset with respect to the at least one reference value.

BRIEF DESCRIPTION OF THE DRAWINGS

FIG. 1A to 1C depict schematic diagrams illustrating examples for calculating distances between strings;

FIG. 2 depicts a schematic block diagram of a database and corresponding distance statistics;

DETAILED DESCRIPTION

Figure 1B:
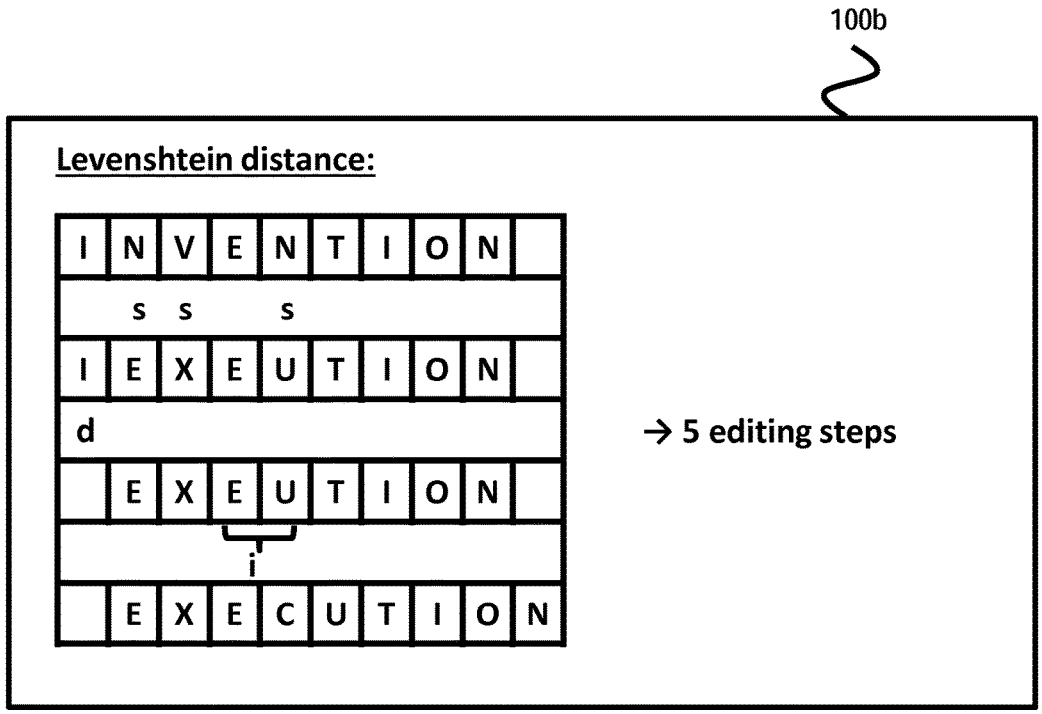

The present invention relates to the technical field of databases and may be applied to any database implementation including a parallel processing implementation (for example, Apache Hadoop, massively parallel processing (MPP) architectures, etc). (Note: the terms "Apache" and/or "Hadoop" may be subject to trademark rights in various jurisdictions throughout the world and are used here only in reference to the products or services properly denominated by the marks to the extent that such trademark rights may exist.)

In databases, performing queries can require large amounts of data to be read to find similar strings via approximate string matching (ASM). Embodiments according to the present disclosure allow the efficient filtering out of non-relevant datasets at the beginning, thus significantly decreasing search times.

Some embodiments of the present invention recognize the following facts, potential problems and/or potential areas for improvement with respect to the current state of the art: (i) existing statistics-based approaches for reducing resource consumption of database queries do not work efficiently for strings comprising non-numerical characters; and (ii) approaches introducing the minimum and maximum value of entries of columns work best for integer or floating-type entries and for sorted tables within databases.

Embodiments of the present invention allow limiting a search in advance by taking into account only those datasets which comprise at least one entry having a distance to a reference value equal to the distance between the reference value and at least one string within the predefined limits of the approximate string matching (i.e. the search range). In other words, only those datasets are selected which are at least partially as similar to the reference value as at least one string comprised by the search range.

The reference values provide a reference system with coordinates in the form of their respective reference values. For these coordinates, the maximum and minimum distances are determined once for each dataset. Thus, the respective low-level distance statistics (for example, maximum and minimum distances) may be reused for subsequent searches. For each search, the distances between the reference values and a search range of the approximate string matching comprising all the strings which are counted as matches are determined. This may, for example, be done by determining the distances between a center point of the search range and each reference value. Alternatively, every other point of the search range may be used, wherein extension of the search range relative to the respective point is taken into account. The distances between the reference values and a search range as well as the initially determined maximum and minimum distances are used in order to check for each dataset whether its data range overlaps with the search range. Only in the case of such an overlap may the database potentially comprise a string which lies within the search range. If there is no overlap, the dataset is considered not to have any potential matches and may be disregarded for the detailed approximate string matching. Thereby unnecessary computations may be avoided.

Using the pre-determined maximum and minimum distances of each dataset in order to perform a pre-selection, computational cost may significantly be reduced in comparison to an approach where an approximate string matching has to be performed on all entries of all datasets.

In one embodiment only a subset of reference values provided for the datasets comprising at least one reference value may be used for the pre-selection of datasets. In one embodiment all reference values provided for the datasets comprising at least one reference value may be used for the pre-selection of datasets. This may have the advantage that the reference values may be chosen depending on the specific approximate string matching for which the subset of datasets is to be selected. Not performing the method for all reference values may further reduce computational costs. For example, only those reference values which have the smallest distance to the search range may be taken into account.

In order to take a new reference value into account, the minimum and maximum distances with respect to the reference value are determined once for each dataset (that is, new low-level distance statistics are generated).

For every new dataset which is added to the database, low-level distance statistics are generated once at the beginning in order to be able to take the new dataset into account for future queries comprising an approximate string matching.

This approach allows for the use of low-level distance statistics (for example, basic statistics considering minimum and maximum distances of datasets) in order to filter out datasets which are not relevant for a given approximate string matching. For this purpose metrics based on alphabetical order are unsuitable, as such an order does not preserve the edit distance which is crucial for approximate string matching.

A 'distance' as introduced herein describes a measure for a similarity between two strings. As will be described below, such a similarity between strings can be calculated in a plurality of ways. One simple example is the calculation of a Hamming distance, which represents the number of digits two strings have in common. Between two strings of equal length, the Hamming distance is the number of positions at which the corresponding symbols are different (that is, it measures the minimum number of substitutions required to change one string into the other). For example, the Hamming distance between the strings 'COAT' and 'COST' is one, as the first, second and fourth digits are identical, while only the third digits are different from each other. Thus, the Hamming distance allows only substitution and hence may only be applied to strings of the same length. According to an alternative definition of the Hamming distance, different length of strings may be taken into account by identifying all the digits constituting the length difference as mismatches. For example, according to this definition the distance between the strings 'COAT' and 'COATING' is three, as 'COATING' is three digits longer than 'COAT'.

Approximate string matching (ASM), also referred to as fuzzy string searching, is a technique of finding strings that match a pattern (for example, the pattern of a search string or search value) approximately rather than exactly. The closeness of a match is measured in terms of the edit distance, the number of primitive operations necessary to convert the respective string into an exact match. Some example primitive operations (in particular, primitive operations for a Levenshtein metric) include: insertion (for example: 'COT'→'COAT'), deletion (for example, 'COAT'→'COT'), and substitution (for example, 'COAT'→'COST').

Some approximate string matchers (for example, those based on a Damerau-Levenshtein metric) also take into account transposition as a primitive operation, in which the positions of two letters, in particular two adjacent strings, are swapped. Changing 'COST' to 'COTS' is an example of a transposition.

Different approximate matchers impose different constraints. Some matchers use a single global unweighted cost (that is, the total number of primitive operations necessary to convert the match to the pattern). For example, if the pattern is 'COIL', 'FOIL' differs by one substitution, 'COILS' by one insertion, 'OIL' by one deletion, and 'FOAL' by two substitutions. If all operations count as a single unit of cost and the limit for matches to be taken into account is set to one: 'FOIL', 'COILS', and 'OIL' are counted as approximate matches, while 'FOAL' is discarded.

Other matchers may specify the number of operations of each type separately, while still others consider a total cost but allow different weights to be assigned to different operations. Some matchers may permit separate assignments of limits and weights to individual groups in the pattern.

According to an example, the method further comprises reading only the datasets which are part of the subset being read from the database into a working memory for carrying out the approximate string matching. This may have the advantage of limiting read operations caused by a database query. Embodiments of the present invention may have the advantage that by the described comparison of the similarity of a search value and the reference value on the one hand and the similarity of a reference value and the contents of datasets on the other hand, a pre-selection of datasets which will most likely comprise the value that is searched for can be realized. If it is, for example, determined that a dataset is much more dissimilar from a reference value than the search value, the dataset will not have to be searched for the search value as it is highly unlikely that the search value is comprised in the dataset. As a result, the search for a search value in a database can be limited to a reduced number of datasets, thereby reducing the number of I/O-operations and the corresponding computational effort for finding a search value in a database.

According to an example, the maximum distance from the search value is equal or larger than a maximum distance value determined for the approximate string matching in the query. This may have the advantage that choosing the maximum distance from the search value being equal to a maximum distance value determined for the approximate string matching in the query allows a maximum of limitation of the search without risking neglecting valid matches. Choosing the maximum distance to be larger allows for varying and, in particular, extending the search range without needing to redo the selection (that is, select a new subset).

According to an example, the minimum and maximum distances each are stored in the respective datasets to which they are assigned. This may have the advantage that the minimum and maximum distances and thus the low-level distance statistics are directly and permanently linked with the respective dataset. When transferring or copying the dataset to a new location within the same or to a new database, the respective low-level distance statistics may always be available for the respective dataset.

According to an example, the datasets are determined to be part of the subset due to an overlap of the respective data ranges with the search range in the case that the respective maximum distance from the search value is equal or larger than the difference of the minimum distance between the values of the entries of the respective dataset and the reference value minus the search distance as well as equal or larger than the difference of the search distance minus the maximum distance between the values of the entries of the respective dataset and the reference value. This may have the advantage that only those datasets are efficiently selected which at least potentially contain an entry relevant for the approximate string matching (that is, a string which may be included in the search range).

According to an example, the reference value is one of a plurality of reference values, the distance statistics comprising minimum and maximum distances for each of the reference values resulting in a set of data ranges for each dataset, each set of data ranges comprising for each reference value a data range being defined with respect to the reference value, the determination of the search distance being performed for each of the reference values resulting in a set of search distances, each search distance of the set of search distances being defined with respect to the reference value, the determination of the subset of datasets being performed for each data range of the set of data ranges, the subset comprising the datasets for which each data range with respect to each reference value overlaps with the respective search range.

The determination of the subset of datasets is then performed for each search distance of the set of search distances. It should be noted that according to this embodiment the subset of datasets will only comprise datasets which match for each reference value the criterion that the data range overlaps with the search range. Thus, if at least for one reference value the data range of a dataset does not overlap with the search range, the dataset will not be included in the subset of datasets to be searched for the search value. This may have the advantage that by introducing a plurality of reference values instead of a single reference value the granularity of the pre-selection of datasets from the plurality of datasets can be increased. Depending on the search value, it may be possible that a single reference value will yield a huge number of datasets for which the search data range overlaps with the search range based on the respective distance statistics. This is especially the case if the search value is highly dissimilar to the reference value, or, in other words, if the distance between the search value and the reference value is very high. However, the distance of the search value to a second reference value may be much smaller, thereby yielding more information when determining the similarity of the second reference value and the datasets of the database. Therefore, the pre-selection of the subset of datasets may be improved by introducing more and more reference values as with an increased number of reference values the possibility for finding one reference value which is very similar to the search value will be increased as well.

According to an example, the number of characters of the reference value is equal or less than the maximum number of characters per entry of the datasets. If, for example, no entry of the datasets is longer than ten characters, no reference value that is longer than ten characters should be chosen. This may have the advantage that by limiting the number of characters of the reference value to the maximum number of characters of the entries no unnecessary dissimilarity between the reference value and the entries of the datasets is introduced. Referring, for example, to the Hamming distance, if no entry is longer than ten characters but the reference value is, for example, fourteen characters long the dissimilarity between the entries of the datasets and the reference value will be always equal to or greater than four.

According to an example, the reference value is a sequence of identical characters.

In some embodiments the datasets and the entries of the datasets are sorted in a lexicographical order, wherein the reference value is a sequence of identical characters. For example, one may use twenty-six reference values, wherein a reference value is a sequence of ten identical letters of the Latin alphabet. In this case, for example, the dataset comprising the first ten entries of the database will have a statistically higher similarity to the reference value comprising all A's than, for example, the last ten entries of the database as the first entries of the database or at least a subset therefrom will start with the letter 'A'. Thus, at least one of the characters of the database entry is identical with a character of the reference value. As a result, the reference values if chosen as described before will function similarly to an index indicating transitions between a first starting character of the entries to a second starting character of the entries.

According to an example, the reference value is a random sequence of characters. This may have the advantage that by using reference values which are generated by a random generator, a frame of reference defined by the reference values may be uniformly distributed over the database entries allowing for an effective pre-selection for every possible search range defined by an approximate string matching.

According to an example, a sequence of characters of the reference value is adapted to the sequences of characters of the values comprised in the entries of the datasets. This may have the advantage that the reference values may be optimized for the respective entries of the datasets, thus improving the efficiency of the pre-selection and reducing computational costs. If, for example, the database comprises five entries, the entries being the words 'CONFIDENCE', 'CONTRACT', 'CONSTITUTION', 'CONTROL' and 'CONNECTION', it may be feasible to choose a reference value which also starts with the letters 'CON'. Another example would be a database comprising internet addresses all starting with 'WWW'. Another possibility for adapting the reference value to the values comprised in the entries of the datasets may be to determine the frequency of a certain character on a certain digit of the entries of the database. A reference value may be then chosen such that it only comprises those characters which are found with the highest frequency on the individual digits of the entries.

According to an example, the reference values are chosen such that for each reference value the distance between the reference value and the remaining reference values is equal or greater than the maximum possible distance between the reference value and a string with the same number of characters. If, for example, the distance is determined by comparing the individual digits of two strings based on the Hamming distance, a reference value comprising eight digits should at least have the distance eight from all other reference values. This may have the advantage that by choosing maximum dissimilar reference values, the information gained by comparing a search value with the reference values is maximized. If, for example, two reference values are very similar, a comparison of a search value with the reference values may yield the same distance for both reference values. Thus, the corresponding distance statistics of the datasets will not bring any additional information compared to the case in which only one of the reference values is used. Therefore, not much information can be obtained by introducing two similar reference values. If, however, the reference values are very dissimilar, a comparison with the search value will give more information on the contents of datasets.

According to an example, the data comprised in the entries is alphanumeric. According to an example, the alphanumerical type of data is character (CHAR) and/or variable character field (VARCHAR) data. This may have the advantage that the present method may be efficiently applied to databases comprising entries with alphanumeric data, in particular character or variable character field data.

According to an example, the distances determined are minimum edit distances. A minimum edit distance is a quantification of the dissimilarity of two strings (for example, words) by counting the minimum number of operations required to transform one string into the other. Different measures of the minimum edit distance are known, which are calculated using different sets of allowable edit operations. Thus, the minimum edit distance reflects the minimum number of editing operations which are necessary to get from a first string to a second string. For example, to get from the string 'STOP' to the string 'STEP' it is only necessary to substitute the letter 'O' by an 'E'. Therefore, the minimum edit distance between those two strings would be 1.

Each operation is assigned a cost value. By counting the overall cost of all operations necessary to get from a first string to a second string the distance between two strings can be determined. This may have the advantage that the minimum edit distance allows for an efficient quantization of similarities of strings.

According to an example, the edit distance is determined according to the Levenshtein metric. The Levenshtein metric may be used for measuring the difference between two strings, wherein the Levenshtein distance between two strings based on the Levenshtein metric is the minimum number of single-character edits (for example, insertions, deletions or substitutions) required to change one string into the other.

The Levenshtein distance $lev_{a,b}(|a|,|b|)$ between two strings a, b may be defined as follows in Equation 1:

Equation 1

The Levenshtein Distance $$lev_{a,b}(i,j) = \begin{cases} \max(i,j) & \text{if } \min(i,j) = 0, \\ \min \begin{cases} lev_{a,b}(i-1,j)+1 \\ lev_{a,b}(i,j-1)+1 \\ lev_{a,b}(i-1,j-1)+1_{(a_i \neq b_j)} \end{cases} & \text{otherwise.} \end{cases}$$

In this embodiment, $1_{(a_i \neq b_j)}$ is equal to 0 when $a_i = b_j$ and equal to 1 otherwise. The first element in the minimum corresponds to deletion (from a to b), the second to insertion and the third to match or mismatch, depending on whether the respective symbols are the same. This may have the advantage that Levenshtein-Metric is easy to calculate and thus the distance statistics for the datasets may, for example, be calculated when filling the database with entries, thereby not causing too much overhead in determining the corresponding distance values.

According to an example, the edit distance is determined according to the Damerau-Levenshtein-Metric. The Damerau-Levenshtein distance is a distance (that is, a string metric) between two strings (that is, a finite sequence of symbols like a word) given by counting the minimum number of operations needed to transform one string into the other, where an operation is defined as an insertion, deletion, or substitution of a single character, or a transposition of two adjacent characters. The Damerau-Levenshtein distance differs from the Levenshtein distance defined above by including transpositions among its allowable operations.

The Damerau-Levenshtein distance $d_{a,b}(|a|,|b|)$ between two strings a, b may be defined as follows in Equation 2:

Equation 2

The Damerau-Levenshtein Distance $$d_{a,b}(i,j) = \begin{cases} \max(i,j) & \text{if } \min(i,j) = 0, \\ \min \begin{cases} d_{a,b}(i-1,j)+1 \\ d_{a,b}(i,j-1)+1 \\ d_{a,b}(i-1,j-1)+1_{(a_i \neq b_j)} \\ d_{a,b}(i-2,j-2) \end{cases} & \text{if } i,j > 1 \text{ and } a_i = b_{j-1} \text{ and } a_{i-1} = b_j, \\ \min \begin{cases} d_{a,b}(i-1,j)+1 \\ d_{a,b}(i,j-1)+1 \\ d_{a,b}(i-1,j-1)+1_{(a_i \neq b_j)} \end{cases} & \text{otherwise.} \end{cases}$$

In this embodiment, $1_{(a_i \neq b_j)}$ is equal to 0 when $a_i = b_j$ and equal to 1 otherwise. Each recursive call matches one of the cases covered by the Damerau-Levenshtein distance: (i) $d_{a,b}(i-1,j)+1$ corresponds to a deletion (from a to b); (ii) $d_{a,b}(i,j-1)+1$ corresponds to an insertion (from a to b); (iii) $d_{a,b}(i-1,j-1)+1_{(a_i \neq b_j)}$ corresponds to a match or mismatch, depending on whether the respective symbols are the same; and (iv) $d_{a,b}(i-2,j-2)$ corresponds to a transposition between two successive symbols. This may have the advantage that Damerau-Levenshtein-Metric is easy to calculate and thus the distance statistics for the datasets may, for example, be calculated when filling the database with entries, thereby not causing too much overhead in determining the corresponding distance values.

Figure 1C:
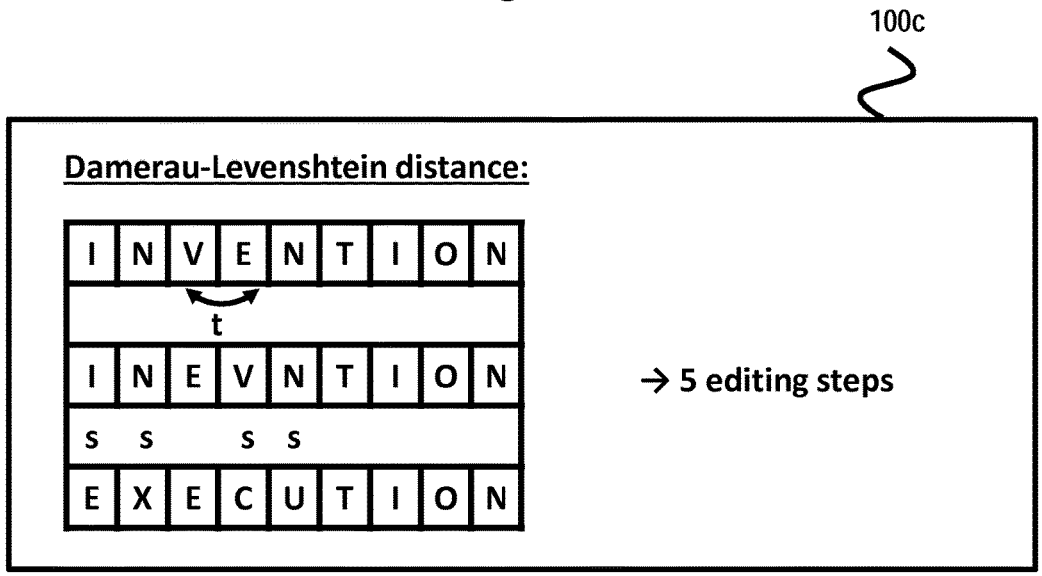

FIGS. 1A-1C provide an example of how to determine the distance between two strings: 'INVENTION' and 'EXECUTION'. In the first example depicted in FIG. 1A, the Hamming distance between the strings 'INVENTION' and 'EXECUTION' is determined.

The Hamming distance counts the number of digits which differ from each other (that is, the number of substitutions required in order to transform one string into the other). As shown in diagram 100a of FIG. 1A, the first five digits of the two strings are not identical, while the last four digits, 'T', 'I', 'O' and 'N' are identical. Thus, the Hamming distance between the two strings, 'INVENTION' and 'EXECUTION', is five. Determining the Hamming distance between two strings may be an easy way to determine a distance, however, two strings might be very similar even while the Hamming distance between the two strings is very large. For example, consider the two strings 'KNOWN' and 'UNKNOWN'. As the individual characters of the identical portion 'KNOWN' are shifted by two letters 'UN', the Hamming distance between those two strings would be 6 as only the second digit 'N' is the same for both strings. Thus the Hamming distance is determined to be large, even though the two strings are quite similar.

Another example for determining a distance based on a minimum edit distance between two string is depicted in diagram 100b of FIG. 1B: the Levenshtein distance. The Levenshtein distance describes how many editing steps (for example, insertion, deletion, or substitution) have to be performed in order to get from a first string to a second string.

As shown in FIG. 1B, the second, third and fifth letters of the string 'INVENTION' are substituted by other letters, ('N', 'V', and 'N' by 'E', 'X', and 'U', respectively). The substitution of letters is indicated by an 's'. In a subsequent fourth step after the first three substitution steps, the first letter of the string 'I' is deleted, as indicated by a 'd'. To get from the resulting string 'EXEUTION' to the final string 'EXECUTION' the letter 'C' has to be inserted between the 'E' and 'U', as indicated by an 'i'. As a result, at least five editing steps are necessary to transform the string 'INVENTION' into the string 'EXECUTION': three letter substitutions, one letter deletion, and one letter insertion. Of course, there may be other ways to get from the first string to the second string, yet a minimum edit distance like the Levenshtein distance in general refers to the minimum number of editing steps.

The different types of editing steps may be weighted with different weighting factors (that is, different cost values may be assigned to different operations). If, in the example depicted in FIG. 1A, each operation has the cost value 1, it would result in a total distance between the two strings of five. However, it is also possible to assign other cost values to the different operations. For example the substitution of a letter by another letter may be assigned to a cost value of 2. In this case the distance between the strings 'INVENTION' and 'EXECUTION' would be eight. This assigning of cost value to the individual editing operations may be adapted to the types of entries in the database.

The difference between the Hamming distance and the Levenshtein distance may become apparent considering the Levenshtein distance for the exemplary strings 'KNOWN' and 'UNKNOWN'. The Levenshtein distance is two as only the first two letters 'UN' have to be inserted to get from 'KNOWN' to 'UNKOWN' in contrast to the Hamming distance of six. Therefore, care is to be taken when selecting a distance to be used.

In diagram 100c of FIG. 1C, the Damerau-Levenshtein distance is calculated for the two strings 'INVENTION' and 'EXECUTION'. In addition to insertions, deletions, and substitutions, the Damerau-Levenshtein distance also considers transpositions of adjacent characters. First, the third and fourth letters 'V' and 'E' of the string 'INVENTION' are transposed, indicated by a 't'. Next, the first, second, fourth, and fifth letters of the string 'INEVNTION' are substituted by the other letters ('I', 'N', 'V', and 'N' by 'E', 'X', 'C' and 'U', respectively). The substitution of letters is indicated by an 's'. As a result, even using the Damerau-Levenshtein distance at least five editing steps are necessary to transform the string 'INVENTION' into the string 'EXECUTION': one letter transposition and four letter substitutions. Of course, there may be other ways to get from the first string to the second string using the Damerau-Levenshtein distance. Even though the Levenshtein distance and the Damerau-Levenshtein distance give the same result for the exemplary strings of FIGS. 1B and 1C, in other cases they may be different. Consider, for example, a simple typographical error such as 'OEN' instead of 'ONE' for which the Levenshtein distance is two, while the Damerau-Levenshtein distance is one The examples depicted in FIG. 1A to 1C are only directed towards strings comprising letters. However, if the database comprises numbers (integer, float, . . . ), the distance between two numbers may be defined as the numerical difference between two numbers. However, it would also be possible to use the minimum edit distance to get from a string of numbers to another string of numbers.

FIG. 2 includes diagram 150 of a database 200 comprising eight entries. The eight entries are the words 'CONFIDENCE', 'COMPANY', 'RESISTOR', 'SLOWDOWN', 'MARKER', 'CHEROKEE', 'EARTH', and 'CEMENT'. These eight strings are sub-divided into two datasets 202 and 204, each dataset comprising four strings. Assigned to those datasets are distance statistics 210. The determination of those distance statistics 210 will be now discussed.

In the example depicted in FIG. 2, the two reference values each are a sequence of ten identical letters: 'O' in case of the first reference value Ref1 and 'E' in case of the second reference value Ref2. In view of the fact that the longest database entry ('CONFIDENCE') comprises ten digits, choosing reference values also comprising ten digits appears to be a reasonable choice. Nevertheless, in other embodiments other lengths may be chosen for the reference values.

Focusing on the first dataset 202, the determination of the individual distances of the strings included in the first dataset 202 to the first reference value Ref1 will now be described. The first string, 'CONFIDENCE', has one letter in common with the reference value Ref1. In the case where the distance is defined as the minimum edit distance in form of the Levenshtein distance between two strings, wherein each editing operation has a cost value of 1, the distance between the string 'CONFIDENCE' and a sequence of ten O's is nine. For the subsequent string, 'COMPANY', where there is also only one letter in common with the reference value, the corresponding distance is nine as well. The third string of the first dataset 202 is 'RESISTOR' also having a distance of nine. As the last word of dataset 202, 'SLOWDOWN', has two letters in common with the first reference value Ref1, the distance between the fourth database entry and the first reference value Ref1 is eight.

As a result, for the first dataset 202 the minimum distance of an entry from the first reference value is eight, wherein the maximum distance of the entries of the first dataset 202 from the first reference value is ten. This information is stored in the distance statistics 210.

The determination of the distance statistics for the second dataset 204 is conducted accordingly. The results for the minimum and maximum distances of the datasets from the first reference value are given in FIG. 2. The same determination of distance values is also conducted for the second reference value Ref2 being 'EEEEEEEEEE'. While, for example, the fourth string of the first dataset 202, 'SLOWDOWN' has a distance of eight from the first reference value Ref1, the distance between the string 'SLOWDOWN' and the second reference value Ref2 is only ten. Therefore, the distance statistics for the second reference value apparently differ from the distance statistics for the first reference value.

As the determination of the distance statistics described above does not require a significant computational effort, the determination of the distance statistics may, for example, be executed once the database is loaded with entries. To this end reference values should be defined prior to or shortly after filling the database with entries.

For each varchar/char/string column of the database a set of reference values may be defined. For example, the set of reference values may include N different strings such as: {'aaaaaaaa', 'bbbbbbbb', 'cccccccc', . . . , 'zzzzzzzz'}. Further, for each dataset stored in the database which contains the respective column, low-level distance statistics are stored and defined, as shown in Table 1:

TABLE 1

|  | Reference value | | | |
| --- | --- | --- | --- | --- |
| Table 1 | 'aaaaaaaa' | 'bbbbbbbb' | . . . | 'zzzzzzzz' |
| Min distance from refpoint | 8 | 8 | . . . | 8 |
| Max distance from refpoint | 7 | 8 | . . . | 8 |

The distance may, for example, be measured by the Levenshtein metric or Damerau-Levenshtein metric.

The approximate string matching (ASM) involves fuzzy searching. In other words, it looks for all words equal or similar to a given string. Considering, for example, a query searching for persons with the surname 'Mckeen', it may not be certain whether to return 'Mcceen', 'Mckeen', 'McKeen' and/or 'McCeen'. Using ASM enables one to find all of these results. It is worth noting that similar words in such sense are those where the edit distance (for example, the Levenshtein distance or Damerau-Levenshtein distance) is small.

FIG. 3A to 3D depict schematic diagrams illustrating the determination of a subset of datasets. For a given reference value or reference point R, distance statistics are assigned to each dataset comprising a minimum distance (min) and a maximum distance (max). The minimum distance (min) defines the smallest distance between the reference value R and the closest entry of the respective dataset. The maximum distance (max) defines the largest distance between the reference value R and the entry of the respective dataset being furthest away. Thus, all the entries of the dataset are located somewhere within the circular band delimited by the two circles with radius min and max. The approximate string matching searches for strings, i.e. entries of the datasets, which approximately match the search value S. All these strings which are considered to be a valid approximate match of the search value S have to be located within the circle with radius T around the search value S defining the search range. The search distance (that is, the distance between the search value S and the reference value R) is denoted by K. A dataset may only be relevant for a given approximate string matching if the data range of the dataset and the search range of the approximate string matching overlap as shown in diagram 300a of FIG. 3A. In this case, the dataset may potentially comprise an entry which lies within the search range: a valid approximate match of the search value S.

Figure 3A:
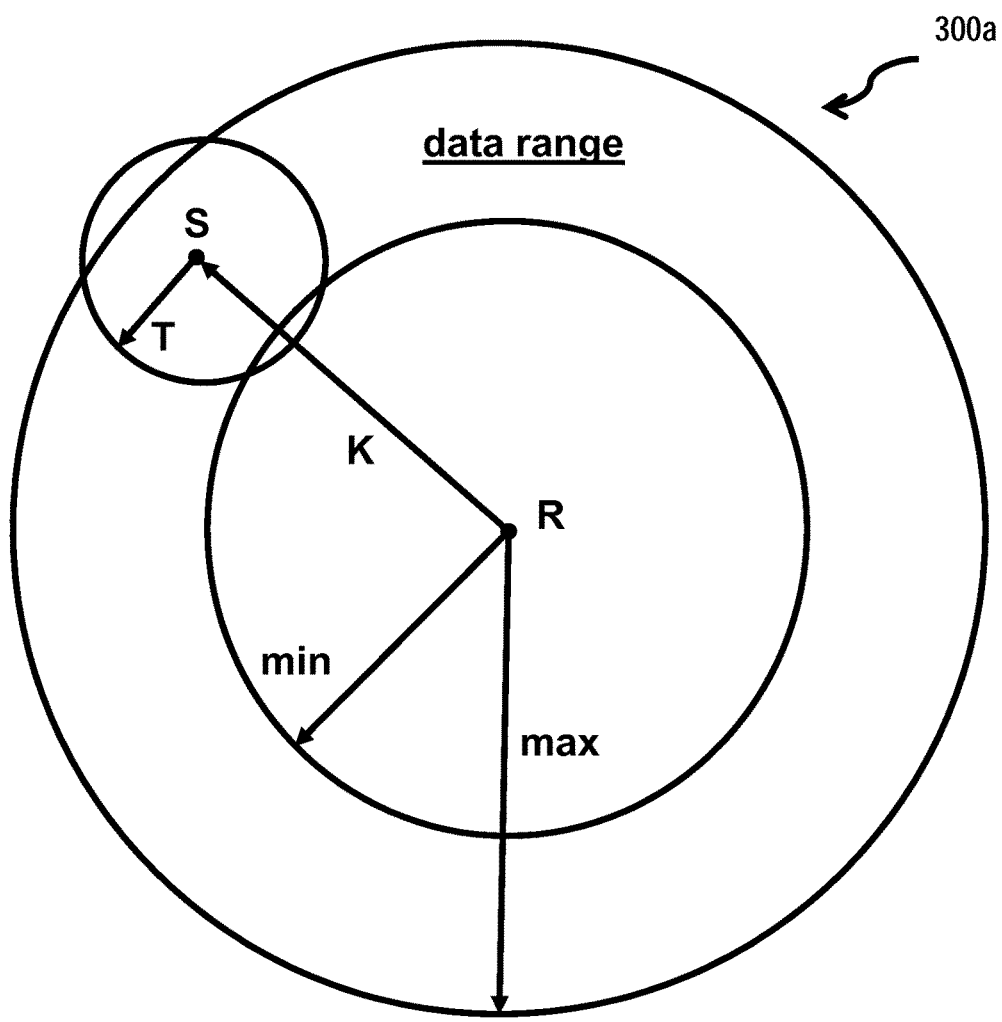
FIG. 3A to 3C depict schematic diagrams illustrating the determination of a subset of datasets.
Figure 3B:
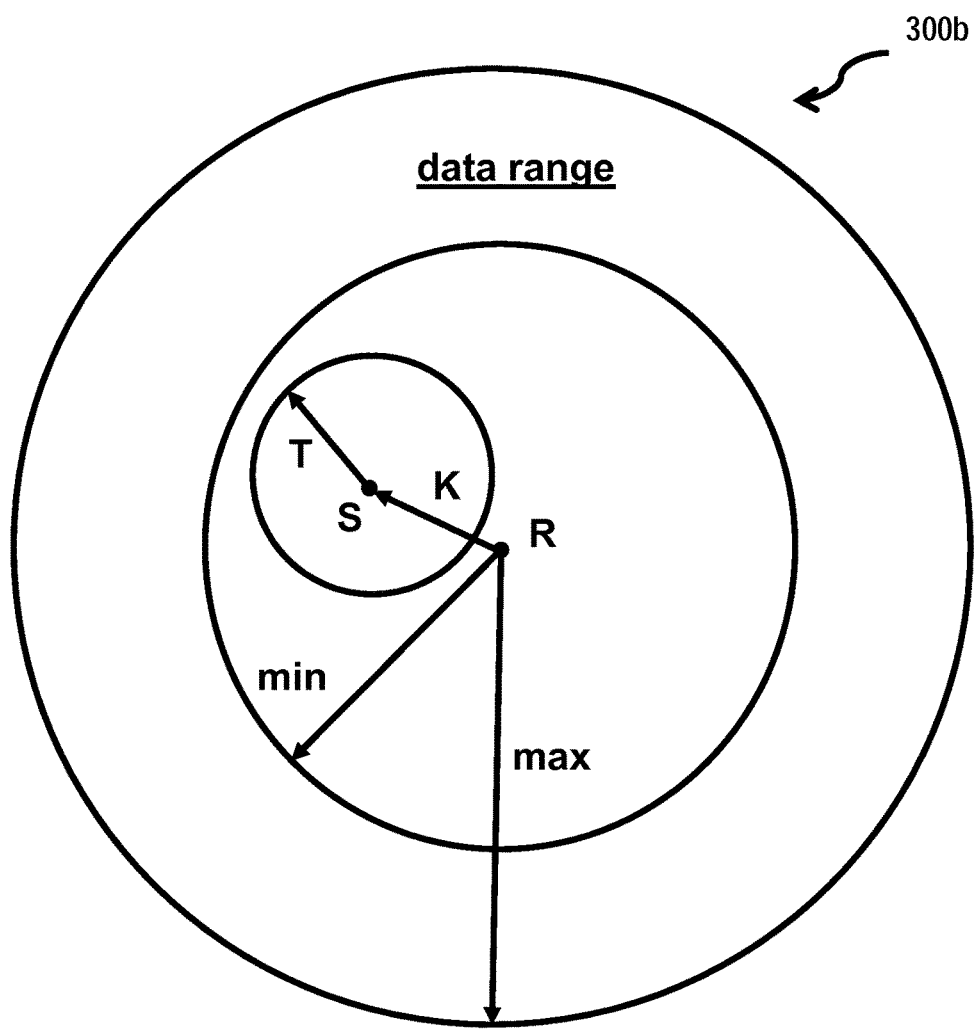
Figure 3C:
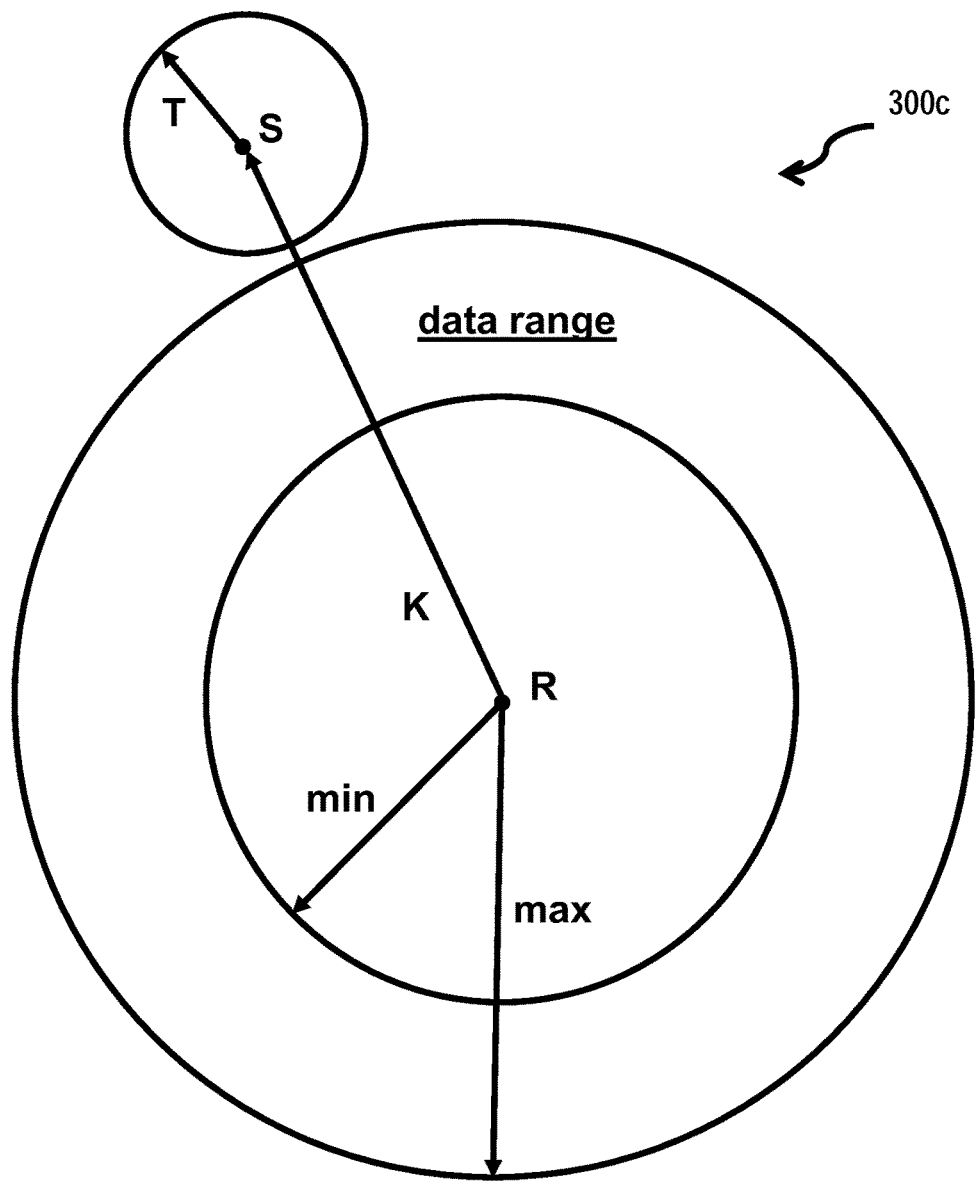

Diagrams 300b and 300c of FIGS. 3B and 3C, respectively, show constellations in which the data range of the dataset and the search range of the approximate string matching do not overlap (that is, cases in which there is no chance that the respective dataset comprises any entry located within the search range). Those datasets may be disregarded in order to simplify and accelerate the search. In FIG. 3B, the search range in its entirety is located closer to the reference value R than the data range (that is, K+T<min). Therefore, all datasets with min−K>T are disregarded. In other words, a dataset to be accepted as relevant and taken into account as a member of the subset of datasets on which the approximate string matching is performed has to satisfy min−K≤T. In FIG. 3C, the search range in its entirety is located further away from the reference value R than the data range (that is, K−T>max). Therefore, all datasets with K−max>T may be disregarded. In other words, a dataset in order to be taken into account as a member of the subset of datasets further has to satisfy K−max≤T. In summary, all datasets for which min−K≤T and K−max≤T hold true may be accepted and read into the RAM of computer system such that the approximate string matching may be performed thereon, while all datasets with min−K>T or K−max>T may be discarded.

Figure 4:
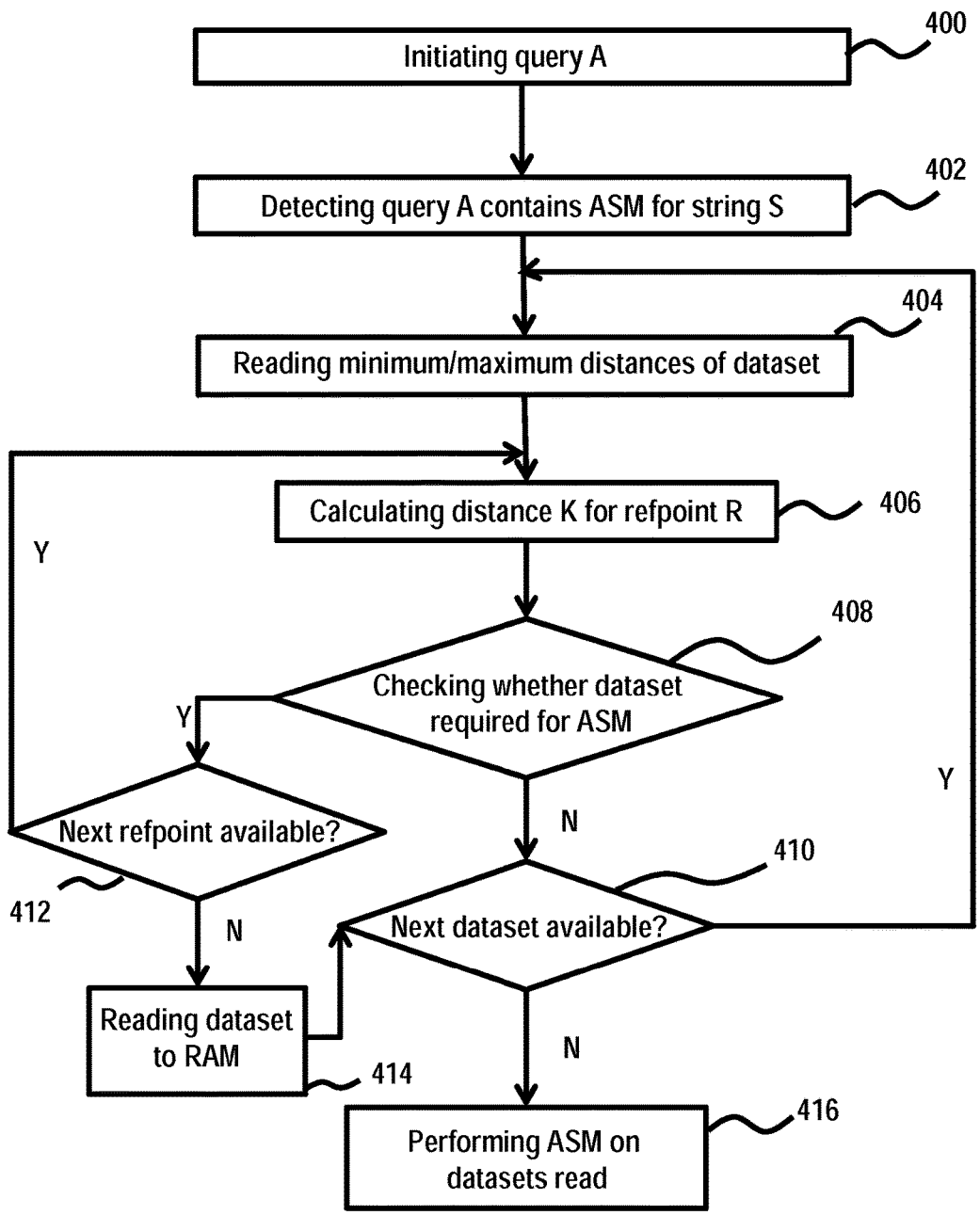
FIG. 4 depicts a schematic flow diagram of a method for determining a subset of datasets.

FIG. 4 depicts a schematic flow diagram of a method for determining a subset of datasets. In block 400 a query A is initiated comprising an approximate string matching (ASM) with respect to a string S (a search value). In block 402 it is detected that the query A comprises the ASM for string S. In block 404, for a first database the maximum distance (max) and minimum distance (min) for a first reference value (refpoint R) are read to a RAM of the computer system for processing the query. In the case that the distance statistics of the dataset comprise min and max values for more than one reference value all min and max values may be read to the RAM. In block 406 the search distance K for the reference value R (the distance between the search value S and the reference value R) is calculated. Based on the max and min from block 404 and the search distance K from block 406 it is checked in block 408 whether the database is required for ASM. In this block, it is checked whether there is a chance that the respective database comprises an entry which lies within the search range (that is, whether the data range of the dataset defined by min and max overlaps the search range). This is true if the dataset satisfies both criteria min−K≤T and K−max≤T. Both criteria being satisfied, the method proceeds with block 412. In block 412, it is checked whether a further reference value is available for which corresponding min and max values have been assigned to the dataset. If this is not the case (that is, if the dataset has satisfied the above identified criteria for all reference values available) the respective dataset is read to the RAM of the computer system in block 414 and the process continuous in block 410 by checking for further available datasets. In the case where a further reference value assigned to the dataset is available, the method continuous with calculating the search distance for the respective further reference value according to block 406. In the case where the min and max values assigned to the respective further reference value have not yet been read to the RAM in block 404, they may be read at this stage. Thereupon, it is checked whether the dataset also satisfies the criteria min−K≤T and K−max≤T for the respective further reference value.

This loop is repeated until either the database satisfies the above identified criteria for all reference values available, in which case the process continues with block 414 or the dataset fails to satisfy the criteria for one of the reference values. In the case where min−K>T or K−max>T holds true for one of the reference values, the process continuous in block 410 by checking for further available datasets. In the case where there are further datasets available, the same method as described above is applied to the further dataset and the process continuous with block 404. In the case where no further datasets are available, in block 416 ASM is performed on the datasets read which form the subset of datasets on which ASM for the search value S is to be carried out.

In summary, query A is executed on the database system. A parser of the computer system for performing the query may detect that the query A contains ASM for string S. During execution of the query A and processing of ASM, the database engine is reading from disk(s) all relevant datasets necessary for performing the ASM. The database engine is able to determine, based on dataset's low-level distance statistics, whether a given dataset needs to be read from the disk or not. All datasets read from the disk are processed using an ASM method in order to find the result set of ASM for string S.

Figure 5:
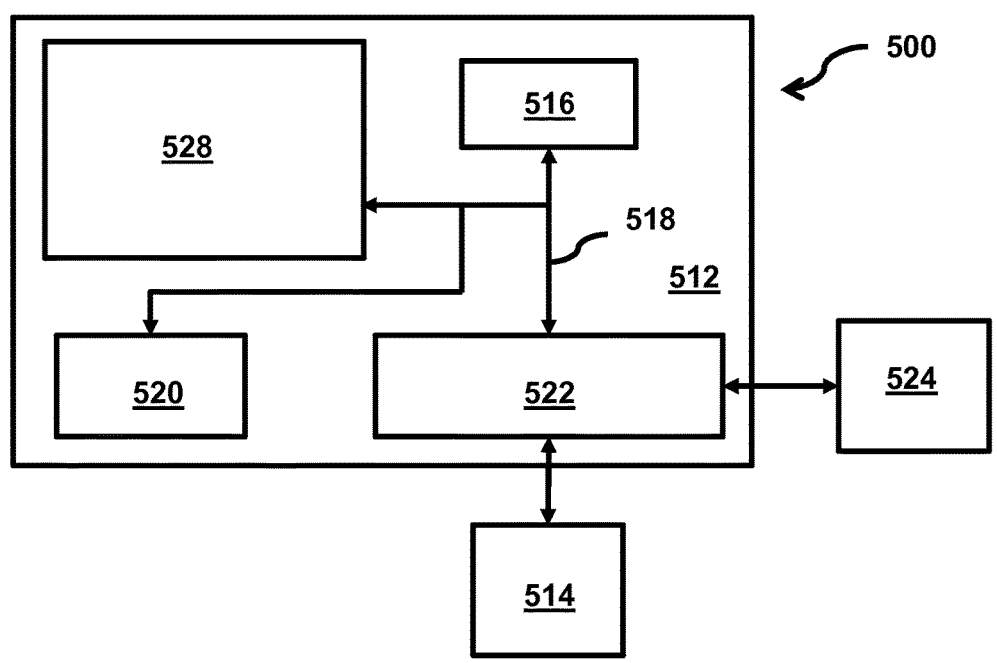
FIG. 5 depicts a schematic block diagram of a computer system performing a database query.

FIG. 5 shows a computer system or server 512 in system 500 in the form of a general-purpose computing device. The components of computer system 512 may include, but are not limited to, one or more processors or processing units 516, a memory system 528, and a bus 518 that couples various system components including the memory system 528 to processor 516.

Computer system 512 typically includes a variety of computer system readable media. Such media may be any available media that is accessible by computer system 512, and it includes both volatile and non-volatile media, removable and non-removable media.

Memory system 528 may include computer system readable media in the form of volatile memory, such as random access memory (RAM) and/or cache memory. The memory system may include one or more active buffered memory devices. The active buffered devices may include a plurality of memory elements, e.g. chips. The active buffered memory device may include layers of memory that form a three dimensional ('3D') memory device where individual columns of chips form vaults in communication with the processing units 516. The active buffered memory device may comprise partitions that may be concurrently accessed by a plurality of processing elements, where the partitions may be any suitable memory segment, including but not limited to vaults.

The processing units 516 may issue requests to the memory system, utilizing the dynamic array data structure and associated metadata to implement an application.

Computer system 512 may also communicate with one or more external devices 514 such as a keyboard, a pointing device, a display 524, etc.; one or more devices that enable a user to interact with computer system 512; and/or any devices (e.g., network card, modem, etc.) that enable computer system 512 to communicate with one or more other computing devices. Such communication can occur via I/O interface(s) 522. Still yet, computer system 512 can communicate with one or more networks such as a local area network (LAN), a general wide area network (WAN), and/or a public network, e.g. the Internet, via network adapter 520. As depicted, network adapter 520 communicates with the other components of computer system/server 512 via bus 518.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is an objective of the present invention to provide for an improved computer-implemented method, a computer program product and a computer system for processing a query in a database. Embodiments of the present invention can be freely combined with each other if they are not mutually exclusive.

In one aspect, the invention relates to a computer-implemented method for processing a query in a database, the query involving an approximate string matching for a search value, the database comprising a plurality of datasets, the datasets comprising entries, wherein distance statistics are assigned to each dataset, the distance statistics describing the minimum and maximum distance between the values of the entries of the dataset and at least one reference value, the minimum and maximum distances assigned to each dataset defining the limits of a data range for the respective dataset with respect to the at least one reference value, the method comprising: (i) determining the distance between the search value and the at least one reference value, said determination resulting in a search distance with respect to the at least one reference value, (ii) determining a maximum distance from the search value to be considered for the approximate string matching, said maximum distance from the search value defining a search range for the approximate string matching around the search value, (iii) determining a subset of datasets from the plurality of datasets comprising the datasets for which each data range with respect to each reference value overlaps with the search range, and (iv) carrying out the approximate string matching for the search value on the subset of datasets.

In a further aspect, the invention relates to a computer program product, the computer program product comprising a computer readable storage medium having machine executable instructions embodied therewith, the executable instructions being executable by a processor for processing a query in a database, the query involving an approximate string matching for a search value, the database comprising a plurality of datasets, the datasets comprising entries, wherein distance statistics are assigned to each dataset, the distance statistics describing the minimum and maximum distance between the values of the entries of the dataset and at least one reference value, the minimum and maximum distances assigned to each dataset defining the limits of a data range for the respective dataset with respect to the at least one reference value, execution of the executable instructions causes the processor to: (i) determine the distance between the search value and the at least one reference value, said determination resulting in a search distance with respect to the at least one reference value, (ii) determine a maximum distance from the search value to be considered for the approximate string matching, said maximum distance from the search value defining a search range for the approximate string matching around the search value, (iii) determine a subset of datasets from the plurality of datasets comprising the datasets for which each data range with respect to each reference value overlaps with the search range, and (iv) carry out the approximate string matching for the search value on the subset of datasets.

In yet a further aspect, the invention relates to a computer system, the computer system comprising a memory for storing machine executable instructions and a processor for executing the machine executable instructions, execution of the machine executable instructions by the processor for processing a query in a database, the query involving an approximate string matching for a search value, the database comprising a plurality of datasets, the datasets comprising entries, wherein distance statistics are assigned to each dataset, the distance statistics describing the minimum and maximum distance between the values of the entries of the dataset and at least one reference value, the minimum and maximum distances assigned to each dataset defining the limits of a data range for the respective dataset with respect to the at least one reference value, execution of the executable instructions causes the system to: (i) determine the distance between the search value and the at least one reference value, said determination resulting in a search distance with respect to the at least one reference value, (ii) determine a maximum distance from the search value to be considered for the approximate string matching, said maximum distance from the search value defining a search range for the approximate string matching around the search value, (iii) determine a subset of datasets from the plurality of datasets comprising the datasets for which each data range with respect to each reference value overlaps with the search range, and (iv) carry out the approximate string matching for the search value on the subset of datasets.

What is claimed is:

1. A computer program product comprising a computer readable storage medium having stored thereon:
   program instructions programmed to receive a query of a database, wherein the query includes a search value, and wherein the database includes a plurality of datasets;
   program instructions programmed to identify the search value within the received query;
   program instructions programmed to determine at least one reference value based on the identified search value;
   program instructions programmed to determine a distance between the search value and the at least one reference value;

program instructions programmed to determine a maximum distance from the search value to be used in searching the database, wherein the maximum distance from the search value defines a search range and is based, at least in part, on the determined distance between the search value and the at least one reference value;

program instructions programmed to determine a subset of datasets from the plurality of datasets that includes datasets for which a data range with respect to each reference value overlaps with the search range; and program instructions programmed to perform approximate string matching for the search value on the subset of datasets;

wherein:

each dataset of the plurality of datasets is assigned a minimum distance and a maximum distance between values of dataset entries and the at least one reference value; and the minimum distance and the maximum distance for each dataset define the data range for the respective dataset with respect to the at least one reference value, and wherein the minimum and maximum distance are permanently stored in a respective dataset to which the minimum and maximum distance are assigned and transferred with the respective dataset when the dataset is copied to a new location or to a new database.

2. A computer system comprising:

a processor(s) set; and a computer readable storage medium;

wherein:

the processor set is structured, located, connected and/or programmed to run program instructions stored on the computer readable storage medium; and the program instructions include:

program instructions programmed to receive a query of a database, wherein the query includes a search value, and wherein the database includes a plurality of datasets;

program instructions programmed to identify the search value within the received query;

program instructions programmed to determine at least one reference value based on the identified search value;

program instructions programmed to determine a distance between the search value and the at least one reference value;

program instructions programmed to determine a maximum distance from the search value to be used in searching the database, wherein the maximum distance from the search value defines a search range and is based, at least in part, on the determined distance between the search value and the at least one reference value;

program instructions programmed to determine a subset of datasets from the plurality of datasets that includes datasets for which a data range with respect to each reference value overlaps with the search range; and program instructions programmed to perform approximate string matching for the search value on the subset of datasets;

wherein:

each dataset of the plurality of datasets is assigned a minimum distance and a maximum distance between values of dataset entries and the at least one reference value; and the minimum distance and the maximum distance for each dataset define the data range for the respective dataset with respect to the at least one reference value, and wherein the minimum and maximum distance are permanently stored in a respective dataset to which the minimum and maximum distance are assigned and transferred with the respective dataset when the dataset is copied to a new location or to a new database.

* * * * *